United States Patent
Buettgen et al.

(10) Patent No.: US 11,226,402 B2
(45) Date of Patent: Jan. 18, 2022

(54) OPTICAL RANGING SYSTEMS INCLUDING OPTICAL CROSS-TALK REDUCING FEATURES

(71) Applicant: AMS SENSORS SINGAPORE PTE. LTD., Singapore (SG)

(72) Inventors: Bernhard Buettgen, Adliswil (CH); Steffen Heinrich, Mülligen (CH); Marco Ivano Buraschi, Zürich (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 1222 days.

(21) Appl. No.: 15/618,245

(22) Filed: Jun. 9, 2017

(65) Prior Publication Data

US 2017/0356982 A1 Dec. 14, 2017

Related U.S. Application Data

(60) Provisional application No. 62/347,863, filed on Jun. 9, 2016.

(51) Int. Cl.
*G01B 11/02* (2006.01)
*G01S 7/481* (2006.01)
*G01S 17/08* (2006.01)

(52) U.S. Cl.
CPC ............ *G01S 7/4813* (2013.01); *G01S 17/08* (2013.01)

(58) Field of Classification Search
CPC ................................ G01S 7/4813; G01S 17/08
See application file for complete search history.

(56) References Cited

U.S. PATENT DOCUMENTS

| 7,511,257 B2* | 3/2009 | Lee ................... H01L 27/14623 250/208.1 |
| 8,791,489 B2 | 7/2014 | Rudmann et al. |
| 9,613,939 B2 | 4/2017 | Rossi et al. |
| 9,761,739 B2* | 9/2017 | Carey ............... H01L 31/02024 |
| 9,773,834 B2* | 9/2017 | Peng ................. H01L 21/76224 |
| 10,244,188 B2* | 3/2019 | Saylor .................... H04N 7/183 |
| 2009/0001435 A1* | 1/2009 | Aurola ................ H01L 27/1446 257/292 |
| 2009/0152664 A1* | 6/2009 | Klem ................ H01L 27/14641 257/440 |
| 2009/0302414 A1* | 12/2009 | Ebefors ................... H01L 23/66 257/506 |
| 2011/0018967 A1* | 1/2011 | Mirbach ................. G01S 17/89 348/46 |

(Continued)

FOREIGN PATENT DOCUMENTS

WO WO 2017/069708 4/2017

*Primary Examiner* — Samantha K Nickerson
(74) *Attorney, Agent, or Firm* — Michael Best and Friedrich LLP

(57) ABSTRACT

An optical ranging system includes a support, a light emitter mounted on the support, and a time-of-flight ("TOF") sensor chip mounted on the support. The TOF sensor chip, for example, includes at least one main pixel and at least one reference pixel in a semiconductor substrate. A barrier that is substantially non-transparent to light emitted by the light emitter separates the at least one reference pixel from the at least one main pixel. The optical ranging system also includes features for reducing optical cross-talk between the light emitter and the pixels of the TOF sensor.

16 Claims, 4 Drawing Sheets

(56) References Cited

U.S. PATENT DOCUMENTS

| | | | |
|---|---|---|---|
| 2011/0186736 A1* | 8/2011 | Yao | G01S 7/4813 250/338.4 |
| 2011/0309236 A1* | 12/2011 | Tian | H01L 27/14687 250/208.1 |
| 2013/0019461 A1 | 1/2013 | Rudmann et al. | |
| 2013/0292706 A1* | 11/2013 | Costello | H01L 31/173 257/82 |
| 2015/0207016 A1* | 7/2015 | Tharumalingam | G01S 7/4813 438/25 |
| 2015/0357360 A1* | 12/2015 | Tian | H01L 27/14605 250/208.2 |
| 2016/0025855 A1* | 1/2016 | Camarri | G01S 17/08 250/206.1 |
| 2016/0161599 A1* | 6/2016 | Seliuchenko | H01L 27/14649 250/338.4 |
| 2016/0306042 A1* | 10/2016 | Schrank | H01L 31/02164 |

* cited by examiner

OPTICAL RANGING SYSTEMS INCLUDING OPTICAL CROSS-TALK REDUCING FEATURES

CROSS-REFERENCE TO RELATED APPLICATION(S)

This application claims the benefit of priority of U.S. Provisional Patent Application No. 62/347,863, filed on Jun. 9, 2016. The contents of that application are incorporated herein by reference in their entirety.

FIELD OF THE DISCLOSURE

The present disclosure relates to optical ranging systems that include optical cross-talk reducing features.

BACKGROUND

Various types of sensors are used in a wide range of applications, including consumer electronics and medical devices, among others. Some of these sensors use optical signals to sense or measure parameters of interest. Optical ranging systems, for example, can collect distance data for one or more objects in a scene. Distance data can include, for example, the distance between the one or more objects and the optical ranging system. Such optical ranging systems typically contain an illumination source and a multitude of pixels, such as demodulation pixels.

In some applications, it is desirable to provide particularly small sensors. Furthermore, there is generally a demand for particularly precise and sensitive sensors. In designing small optical sensors, for example, issues of electrical interference, optical crosstalk, and signal-to-noise ratio often need to be addressed. There are various potential sources of optical interference, including optical crosstalk between the subcomponents of the optical ranging system.

SUMMARY

The present disclosure describes optical ranging systems that include one or more features that can help reduce or prevent the occurrence of optical cross-talk between the light emitter and a time-of-flight ("TOF") or other sensor's pixels. The various optical cross-talk reducing features can be used independently of one another or in combination with one or more other ones of the cross-talk reducing features.

In one aspect, for example, the disclosure describes an optical ranging system that includes a support, a light emitter mounted on the support, and an optical TOF sensor chip mounted on the support. The TOF sensor chip includes at least one main pixel and at least one reference pixel in a semiconductor substrate. A barrier that is substantially non-transparent to light emitted by the light emitter separates the at least one reference pixel from the at least one main pixel. The optical ranging system also includes means for reducing optical cross-talk between the light emitter and the sensor's pixels, wherein the light emitter is on a first side of the means for reducing optical cross-talk and wherein the main and reference pixels are on a second opposite side of the means for reducing optical cross-talk.

Some implementations include one or more of the following features. For example, the means for reducing optical cross-talk can include a trench in the TOF sensor chip. In some instance, the trench extends through at least 80% of the semiconductor substrate. In some implementations, the TOF sensor chip is mounted on the support by an adhesive, and the means for reducing optical cross-talk includes a light reflective or light absorptive material on an edge of the adhesive. In some instances, the means for reducing optical cross-talk includes a reflective or light absorptive material on an edge of the TOF sensor chip.

In some implementations, the means for reducing optical cross-talk includes a cavity containing a light blocking material. The cavity is in a region of the support separating a region where the light emitter is mounted from a region where the TOF sensor chip is mounted.

In some cases, the means for reducing optical cross-talk includes a light barrier mounted on the support in a region separating the light emitter and the TOF sensor chip from one another. The light barrier is operable to absorb or attenuate light having a wavelength of light emitted by the light emitter. In some instances, the light barrier is composed of one or more electronic components and may include, for example, a resistor or capacitor. In some implementations, the light barrier has a height such that a top of the barrier is at the same height as a top of the TOF sensor chip.

In some implementations, the optical ranging system includes one or more lenses to direct incident light onto the main pixels. The one or more lenses are contained in a lens holder having a sidewall that separates the light emitter and the TOF sensor chip from one another. In some cases, the lens holder laterally surrounds the TOF sensor chip and can include a transparent window in a region over the at least one reference pixel.

In some instances, the semiconductor substrate is relatively thin (e.g., a thickness in the range of 100-200 μm).

The optical ranging system also can include a light guide to direct some light generated by the light emitter to the at least one reference pixel.

In another aspect, an optical ranging system includes a support, a light emitter mounted within a cavity in the support, and an optical time-of-flight ("TOF") sensor chip mounted on the support. The TOF sensor chip includes at least one main pixel and at least one reference pixel in a semiconductor substrate. A barrier separates the at least one reference pixel from the at least one main pixel, wherein the barrier is substantially non-transparent to light emitted by the light emitter Mounting the light emitter within the cavity can, in some cases, help reduce optical cross-talk between the emitter and the TOF sensor.

In some instances, the optical ranging system included a light guide to direct some light generated by the light emitter to the at least one reference pixel.

Some implementations are particularly advantageous when the light emitter is a light emitting diode.

The details of one or more implementations are set forth in the accompanying drawings and the description below. Other aspects, features, and advantages will be apparent from the description and drawings, and from the claims.

DETAILED DESCRIPTION

Figure 1:
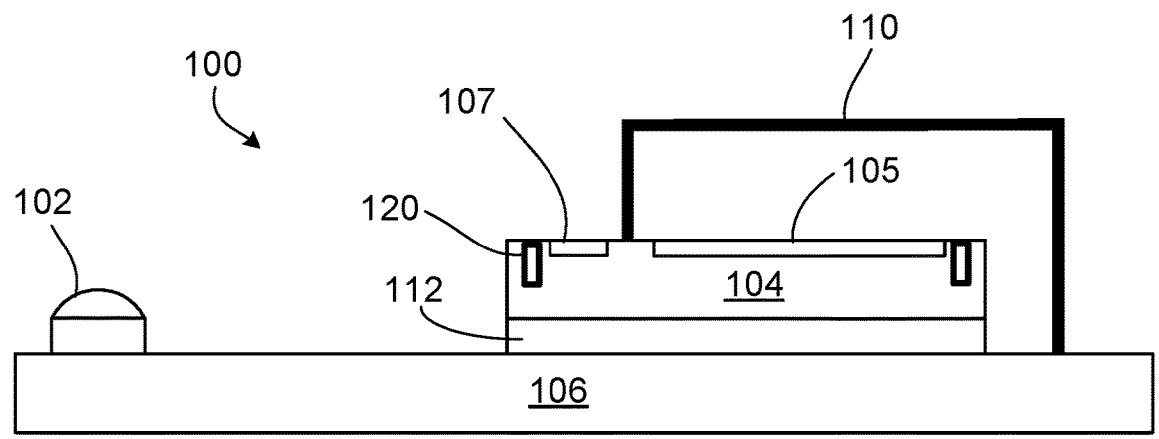
FIG. 1 illustrates an optical ranging system including an example of an optical cross-talk reducing feature.

FIG. 1 illustrates an example of an optical ranging system 100 that includes a light emitter 102 and an optical sensor chip 104 (e.g., a time-of-flight ("TOF") sensor) mounted on a first side of a support 106 such as a printed circuit board (PCB) or lead frame. In operation, light from the emitter 102 is directed onto one or more objects in a scene. Some of this light can be reflected from the one or more objects toward the TOF sensor 104. Light incident on the TOF sensor 104 can be sensed and processed to obtain, for example, distance data to the object(s). Although the illustrated example is a TOF sensor, some implementations incorporate other types of sensors that include image capture pixels.

The emitter 102 and TOF sensor 104 can be connected electrically to the support 106, for example, by conductive pads or wire bonds. The support 106, in turn, can be connected electrically to other components within a host device (e.g., a smart phone).

The light emitter 102 can be implemented, for example, as an infra-red (IR) light emitting diode (LED), laser diode or vertical cavity surface emitting laser (VCSEL). Other types of emitters may be used for some implementations. In some cases, the emitter may emit light at wavelengths different from IR. The emitter 102 can be mounted to the support 106, for example, by an adhesive such as glue.

The TOF sensor 104 can include one more (e.g., an array) spatially distributed light sensitive elements (e.g., pixels) 105. The TOF sensor 104 can be implemented, for example, as an integrated circuit chip mounted to the support 106, for example, by adhesive 112 such as glue. Various electronics and logic also can be mounted on the support 106 and are operable to read and process the pixel signals.

The TOF sensor 104 also can include one or more reference pixels 107, which preferably are separated from the main pixels 105 by a non-transparent barrier that is substantially opaque to wavelength(s) of light emitted by the emitter 102. In operation, some of the light from the emitter 102 can be directed onto the reference pixel(s) 107 while directing light simultaneously onto one or more objects in a scene. For example, a light guide 140 such as an optical fiber or block-shape beam guiding material can be provided to direct a small amount of the emitter light to the reference pixel(s) 107 (see FIG. 8). In some instances, the light guide can take the form of a reflective surface that directs some of the light from the emitter 102 to the reference pixel(s) 107.

The electronics and logic in the TOF sensor 104 can use signals from the pixels to calculate, for example, the time the light has taken to travel from the emitter to an object of interest and back to the focal plane array. The TOF sensor 104, together with the associated electronics and logic, is thus operable to resolve distance based on the known speed of light by measuring the time-of-flight of a light signal between the sensor and each point of the object.

A lens holder 110 can be provided to hold one or beam shaping elements (e.g., lenses) over the TOF sensor 104 that help direct incident light reflected by the object(s) toward the main pixel(s) 105. The main pixel(s) 105 can include, for example, one or more demodulation or imaging pixels, which is some implementations, are arranged in an array. The lens holder 110 can include an opening 111 (see FIG. 7A) in its top surface to allow light reflected by an object to be sensed by the pixels of the TOF sensor 104. The lens holder 110 itself preferably is substantially opaque to the wavelength(s) of light emitted by the emitter 102 so as to reduce stray light from being sensed by the pixels. In the illustrated example, a portion of the lens holder 110 serves as an opaque barrier separating the reference pixel(s) 107 from the sensor's main pixel(s) 105.

As described in the following examples, various features can be provided to help reduce the occurrence of optical cross-talk between the emitter 102 and the TOF sensor 104. Such optical cross-talk may occur, for example, as the result of deeply generated electrons diffusing through the semiconductor (e.g., silicon) substrate of the TOF sensor 104 and producing a non-modulated signal, which degrades the pixel image. Further, in some cases, reflections (e.g., through the adhesive 112 that attaches the sensor 104 to the support 106) may create modulated signals, which can appear on the pixel image. The features described below can help prevent or reduce such optical cross-talk by preventing light from the emitter 102 from being incident directly onto the edge of the TOF sensor 104 and/or onto the edge of the bonding adhesive 112. The various cross-talk reducing features can be used independently of one another or in combination with one or more of the other cross-talk reducing features.

Some optical cross-talk reducing features can be implemented at the TOF sensor chip level. For example, as illustrated in FIG. 1, one or more trenches (e.g., grooves) 120 can be formed in the TOF sensor substrate. At least one of the trenches 120 (or part of the trench) should be located in a region of the TOF sensor substrate such that the emitter 102 is disposed at one side of the trench and the TOF sensor's main pixels 105 and reference pixel(s) 107 are disposed at the other side of the trench. The trenches 120 can act to block light generated by the emitter 102 that enters the TOF sensor substrate through its side edge(s) from reaching the TOS sensor's pixels. Such trenches can be formed, for example, by etching or dicing into the top surface of the TOF sensor substrate. In some instances, the trenches 120 extend though at least 80% of the overall substrate thickness. Other dimensions may be appropriate for some implementations. Although each trench 120 can be formed as a linear trench that extends parallel to the side edge of the TOF sensor substrate, in other instances the trench 120 can take the form an annular ring surrounding the sensor's pixels.

Figure 2:
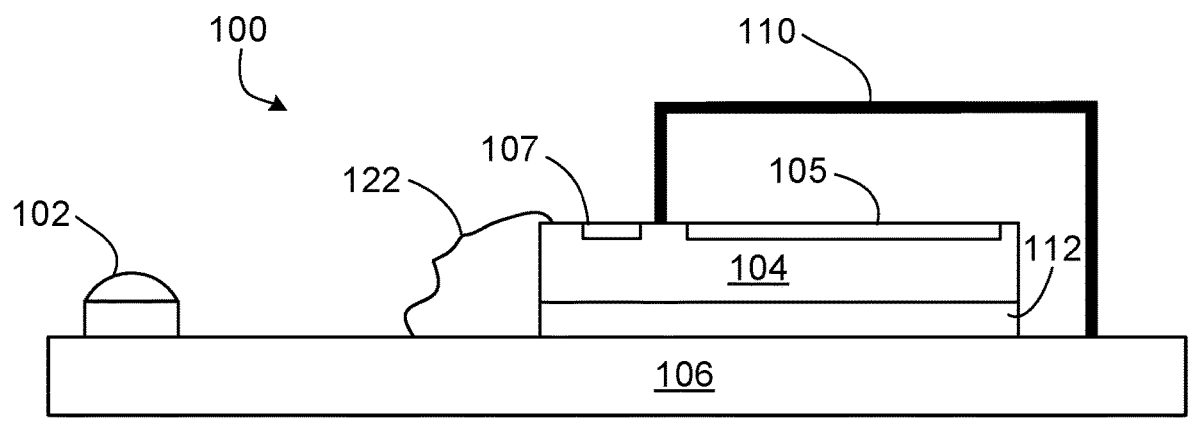
FIG. 2 illustrates an optical ranging system including another example of an optical cross-talk reducing feature.

FIG. 2 illustrates another optical cross-talk reducing feature in the form of reflective or highly absorptive material 122 on the edge of the TOF sensor chip and/or the edge of the adhesive 112. The material 122 should be placed at the edge of the TOF sensor chip such that the material 122 substantially prevents the light generated by the emitter 102 from passing through and reaching the TOF sensor substrate and/or the adhesive. In some cases, the material 122 may not completely prevent the light generated by the emitter 102 from passing through and reaching the TOF sensor substrate and/or the adhesive, but may significantly attenuate the emitter light (e.g., at least 90% absorption). Examples of the material 122 include curable polymers (e.g. epoxy) with a filler (e.g. carbon black or pigment) suitable to obtain the desired absorption (e.g., at least 90% absorption).

Figure 3:
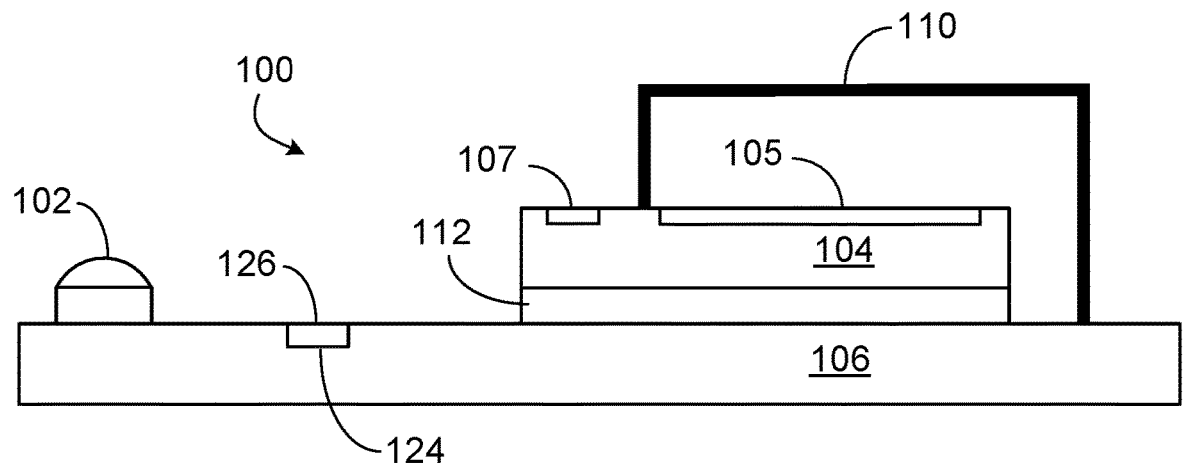
FIG. 3 illustrates an optical ranging system including a further example of an optical cross-talk reducing feature.

Some optical cross-talk reducing features can be implemented at the support (e.g., PCB) level. FIG. 3, for example, illustrates an optical cross-talk reducing feature in the form a cavity 124 filled with a light blocking material 126. The cavity 124 can be in a region of the support 106 separating a region where the light emitter 102 is mounted from a region where the TOF sensor chip 104 is mounted. The light blocking material 126 is operable to absorb or attenuate light having a wavelength of light emitted by the light emitter 102. Examples of the light blocking material 126 include curable polymers (e.g. epoxy) with a filler (e.g. carbon black or pigment) suitable to obtain a highly absorptive material (e.g., at least 90% absorption). This feature can help prevent light generated by the emitter 102 from being coupled to the TOF sensor 104 by way of the support 106.

Figure 4:
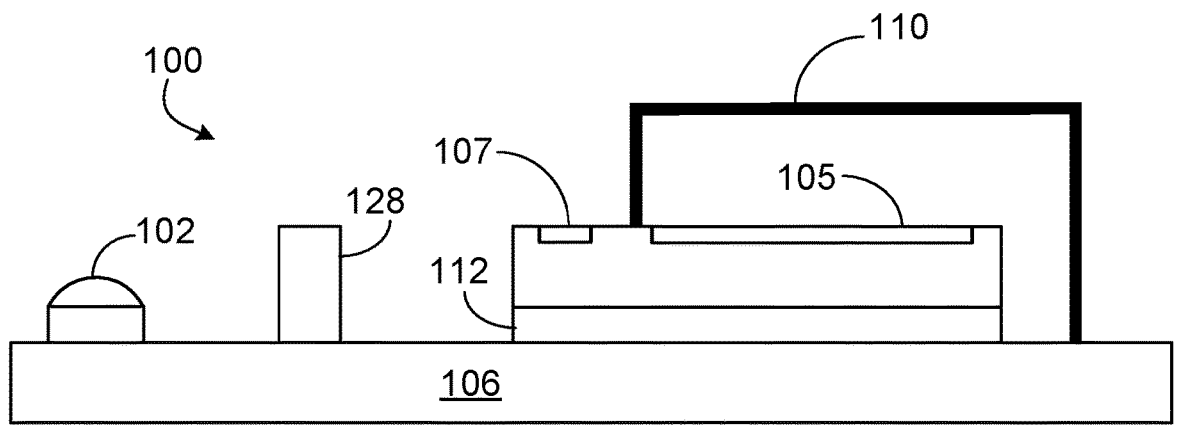
FIG. 4 illustrates an optical ranging system including yet another optical cross-talk reducing feature.

In some instances, as shown in FIG. 4, a light barrier 128 is provided on the support 106 in a region separating the emitter 102 and the TOF sensor 104 chip from one another. Thus, the emitter 102 is located at one side of the barrier 128, whereas the TOF sensor 104 (including the main pixel(s) 105 and the reference pixel(s) 107) are located at the opposite side of the barrier 128. The light barrier 128 can take the form, for example, of a mesa structure 128 that is substantially non-transparent to the wavelength(s) of light emitted by the emitter 102. The height of the barrier 128 may depend on the material of which it is composed, but in some cases, has a thickness of about 600-700 µm. The barrier 128 preferably has a height such that the top of the barrier 128 is at about the same height as the top of the TOF sensor chip 104. Examples of the light barrier 128 include curable polymers (e.g. epoxy) with a filler (e.g. carbon black or pigment) suitable to obtain the desired absorption (e.g., at least 90% absorption). Other suitable materials for some applications include semiconductor or PCB materials.

Figure 5:
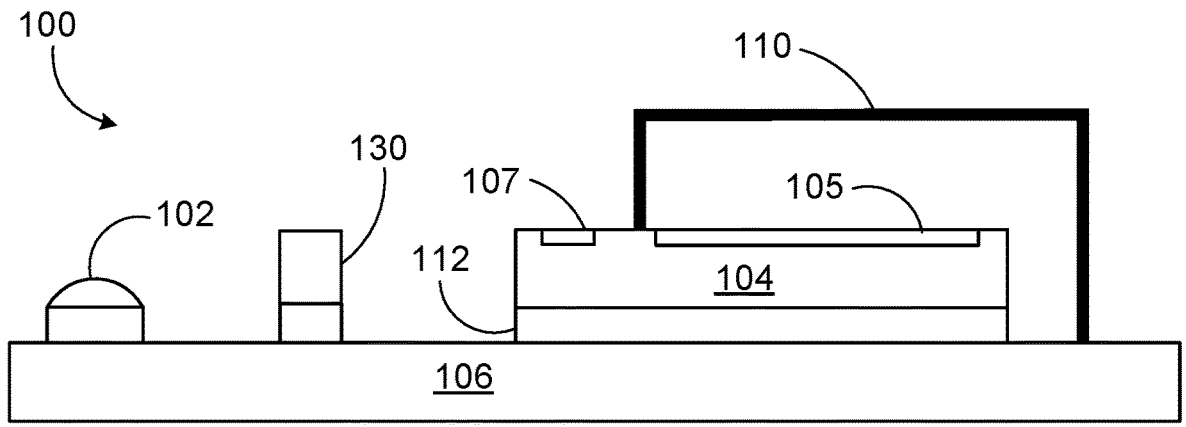
FIG. 5 illustrates an optical ranging system including an example of an optical cross-talk reducing feature.
Figure 6A:
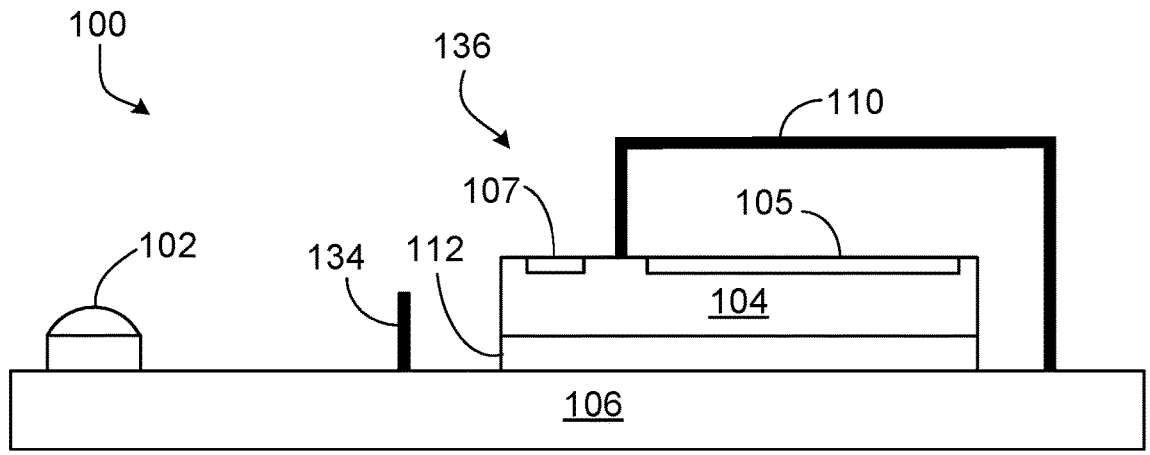
FIG. 6A illustrates an optical ranging system including a further example of an optical cross-talk reducing feature.
Figure 6B:
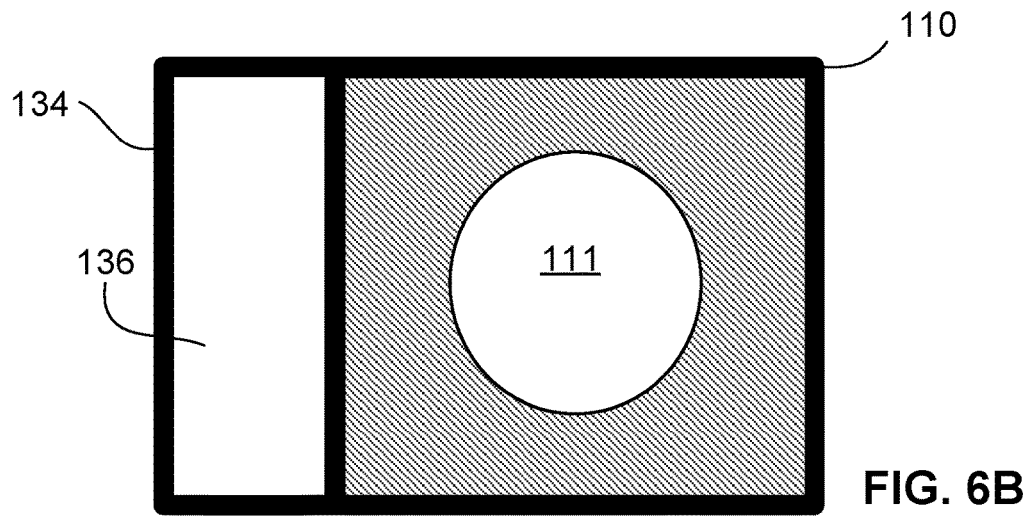
FIG. 6B is a top view of FIG. 6A.

FIG. 5 illustrates another light barrier 130 in the form of one or more electronic components (e.g., a resistor or capacitor) mounted on the support 106 in a region separating the emitter 102 and the TOF sensor 104 chip from one another. The barrier 130 preferably has a height such that the top of the barrier 130 is at about the same height as the top of the TOF sensor chip 104. Here too, the light barrier 130 is substantially non-transparent (i.e., opaque) to the wavelength(s) of light emitted by the emitter 102.

Figure 7:
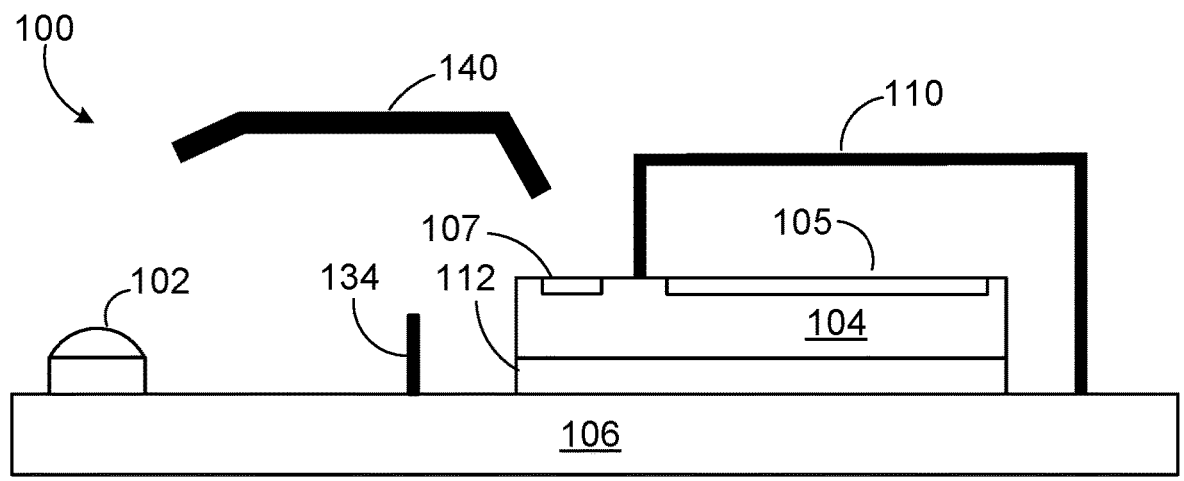
FIG. 7 illustrates an example of an optical ranging system including a light guide.
Figure 8:
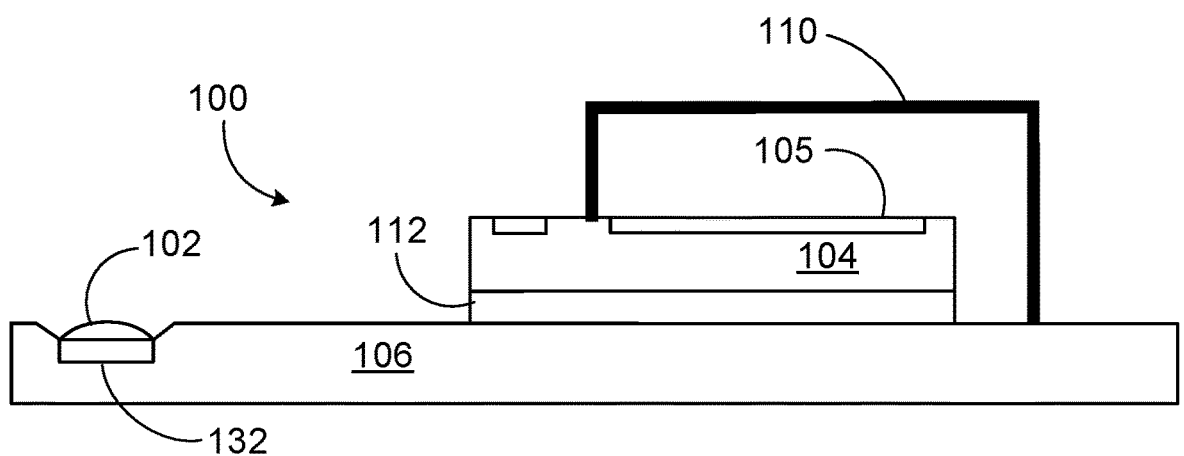
FIG. 8 illustrates an optical ranging system that includes another example of an optical cross-talk reducing feature.

FIG. 7 illustrates another optical cross-talk reducing feature in which the design of the lens holder 110 is adjusted such that it has a sidewall 134 that separates the emitter 102 and TOF sensor 104 from one another. In some cases, the lens holder 110 laterally surrounds the TOF sensor 104. A transparent window 136, which in some cases takes the form of an opening, is provided in the lens holder 110 in the region over the reference pixel(s) so as to allow a small amount of the light from the emitter 102 to be directed to the reference pixel(s), for example, by way of a light guide (e.g., light guide 140 as shown in FIG. 8).

The foregoing examples of FIGS. 1 through 6B describe optical cross-talk reducing barriers that are disposed such that the emitter 102 is located at one side of the barrier, and the TOF sensor's main pixel(s) 105 and reference pixel(s) 107 are located at the other side of the barrier. As indicated by FIG. 7, despite the presence of the optical cross-talk reducing barrier (which prevents light from the emitter from passing directly to the TOF's reference pixel(s)), a light guide 140 can be provided to allow some of the light from the emitter 102 to be directed to the TOF's reference pixel(s) 107. Such a light guide (or other light guide that directs or reflects some of the emitter light toward the reference pixel(s)) can be included in any of the examples described here.

Some optical cross-talk reducing features can be implemented at the emitter level. FIG. 8, for example, illustrates an optical cross-talk reducing feature in which the emitter 102 is mounted within a cavity 132 formed in the surface of the support 106. This feature can help reduce or prevent light generated by the emitter 102 from propagating directly toward the TOF sensor chip 104. A light guide can be provided for this embodiment as well to direct or reflect some of the emitter light toward the TOF's reference pixel(s).

The extent of light entering the side of the TOF sensor 104 can depend, for example, on the beam characteristics of the light emitter 102. For example, the problem may be more prevalent if the emitter's radiation is emitted in multiple directions, in contrast to a directed light source all of whose light is emitted substantially perpendicular to the TOF sensor 104. Further, the problem also is likely more prevalent on a thick TOF imager. Thus, in some instances, it can be advantageous to reduce the overall thickness of the TOF sensor substrate. For example, the thickness of the TOF sensor substrate can be reduced (e.g., by back lapping) to about 100-200 µm instead of a thickness on the order of 600 µm. The reduction in the TOF sensor thickness can help reduce the likelihood that light from the emitter 102 will impinge on the edge of the TOF sensor substrate so as to produce deeply generated electrons that diffuse through the substrate.

Various modifications can be made within the spirit of this disclosure. Accordingly, other implementations are within the scope of the claims.

What is claimed is:

1. An optical ranging system comprising:
    a support;
    a light emitter mounted on the support;
    an optical time-of-flight ("TOF") sensor chip mounted on the support, the TOF sensor chip including at least one main pixel and at least one reference pixel in a semiconductor substrate;
    a first light barrier separating the at least one reference pixel from the at least one main pixel, wherein the barrier is substantially non-transparent to light emitted by the light emitter; and
    further comprising a second light barrier between the light emitter and the reference and main pixels,
        wherein the second light barrier is mounted on the support in a region separating the light emitter and the TOF sensor chip from one another,
        wherein the light emitter is on a first side of the second light barrier,
        wherein the reference and main pixels are on a second opposite side of the second light barrier, and
        wherein the second light barrier is operable to absorb or attenuate light having a wavelength of light emitted by the light emitter.

2. The optical ranging system of claim 1 wherein the TOF sensor chip is mounted on the support by an adhesive, and wherein the means for reducing optical cross-talk includes a light reflective material on an edge of the adhesive.

3. The optical ranging system of claim 1 wherein the TOF sensor chip is mounted on the support by an adhesive, and wherein the means for reducing optical cross-talk includes a light absorptive material on an edge adhesive, the light absorptive material being operable to absorb or attenuate light having a wavelength of light emitted by the light emitter.

4. The optical ranging system of claim 1 wherein the means for reducing optical cross-talk includes a reflective material on an edge of the TOF sensor chip, the light reflective material reflecting operable to reflect light having a wavelength of light emitted by the emitter.

5. The optical ranging system of claim 1 wherein the means for reducing optical cross-talk includes a light absorptive material on an edge of the TOF sensor chip, the light absorptive material being operable to absorb or attenuate light having a wavelength of light emitted by the light emitter.

6. The optical ranging system of claim 1 wherein the means for reducing optical cross-talk includes a cavity containing a light blocking material, the cavity being in a region of the support separating a region where the light emitter is mounted from a region where the TOF sensor chip is mounted, and wherein the light blocking material is operable to absorb or attenuate light having a wavelength of light emitted by the light emitter.

7. The optical ranging system of claim 1 wherein the second light barrier is composed of one or more electronic components.

8. The optical ranging system of claim 7 wherein the second light barrier includes a resistor or capacitor.

9. The optical ranging system of claim 1 wherein the second light barrier has a height such that a top of the second light barrier is at the same height as a top of the TOF sensor chip.

10. The optical ranging system of claim 1 further including one or more lenses to direct incident light onto the at least one main pixel, the one or more lenses being contained in a lens holder having a sidewall that separates the light emitter and the TOF sensor chip from one another.

11. The optical ranging system of claim 10 wherein the lens holder laterally surrounds the TOF sensor chip.

12. The optical ranging system of claim 10 wherein the lens holder has a transparent window in a region over the at least one reference pixel.

13. The optical ranging system of claim 1 wherein the semiconductor substrate has a thickness in a range of 100-200 μm.

14. The optical ranging system of claim 1 wherein the light emitter is a light emitting diode.

15. The optical ranging system of claim 1 further including a light guide to direct some light generated by the emitter to the at least one reference pixel.

16. The optical ranging system of claim 1 wherein at least one main pixel includes a plurality of demodulation pixels.

* * * * *